(12) United States Patent
Sanchez Rola et al.

(10) Patent No.: US 12,556,573 B2
(45) Date of Patent: Feb. 17, 2026

(54) PROTECTING AGAINST HARM CAUSED BY MALICIOUS WEBSITES

(71) Applicant: Gen Digital Inc., Tempe, AZ (US)

(72) Inventors: Iskander Sanchez Rola, Antibes (FR); Platon Kotzias, Athens (GR); Leylya Yumer, Antibes (FR); Michalis Pachilakis, Dublin (IE); Kevin Alejandro Roundy, El Segundo, CA (US)

(73) Assignee: GEN DIGITAL INC., Tempe, AZ (US)

( * ) Notice: Subject to any disclaimer, the term of this patent is extended or adjusted under 35 U.S.C. 154(b) by 215 days.

(21) Appl. No.: 18/477,791

(22) Filed: Sep. 29, 2023

(65) Prior Publication Data

US 2025/0080572 A1 Mar. 6, 2025

(51) Int. Cl.
*H04L 9/40* (2022.01)

(52) U.S. Cl.
CPC ...... *H04L 63/1441* (2013.01); *H04L 63/1425* (2013.01)

(58) Field of Classification Search
CPC .................................................. H04L 63/1441
See application file for complete search history.

(56) References Cited

U.S. PATENT DOCUMENTS

| | | | | |
|---|---|---|---|---|
| 7,343,626 B1* | 3/2008 | Gallagher | ............ | G06F 21/577 707/999.009 |
| 8,037,067 B1* | 10/2011 | Schnedler | ............ | H04L 67/535 709/224 |
| 8,156,132 B1* | 4/2012 | Kaminski, Jr. | ..... | G06F 16/5854 707/758 |
| 8,910,277 B1* | 12/2014 | Reis | ......................... | G06F 9/54 726/22 |
| 11,303,670 B1* | 4/2022 | Wueest | ................ | H04L 63/145 |
| 11,444,977 B2* | 9/2022 | Starov | ................ | H04L 63/1483 |
| 2007/0107057 A1* | 5/2007 | Chander | ................ | G06F 21/54 726/22 |
| 2009/0254971 A1* | 10/2009 | Herz | ...................... | G06Q 10/10 726/1 |
| 2012/0290938 A1* | 11/2012 | Subbarao | ............. | H04L 67/535 715/738 |

(Continued)

OTHER PUBLICATIONS

Takahashi et al., Tracing and Analyzing Web Access Paths Based on User-Side Data Collection: How Do Users Reach Malicious URLs?, 23rd International Symposium on Research in Attacks, Intrusions and Defenses, Oct. 2020 (Year: 2020).*

*Primary Examiner* — Hieu T Hoang
(74) *Attorney, Agent, or Firm* — MASCHOFF BRENNAN

(57) ABSTRACT

Methods and systems for protecting against harm caused by malicious websites are disclosed. Exemplary embodiments of the present disclosure may protect against harm caused by malicious websites by identifying malicious websites more accurately and reliably. In particular, some embodiments of the present disclosure may receive first resource data from a first web page on a website that is accessed by a first user and second resource data from a second web page on the website that is accessed by a second user. This resource data may be correlated and analyzed. Based on this analysis, a determination may be made that the website is malicious and a security action can be performed.

20 Claims, 4 Drawing Sheets

(56) References Cited

U.S. PATENT DOCUMENTS

| | | | |
|---|---|---|---|
| 2013/0117817 A1* | 5/2013 | Gantman | H04L 67/02 709/228 |
| 2013/0347129 A1* | 12/2013 | Samuelsson | H04L 9/3231 726/28 |
| 2014/0189864 A1* | 7/2014 | Wang | G06F 21/566 726/23 |
| 2015/0326606 A1* | 11/2015 | Chen | H04L 63/1416 726/23 |
| 2016/0005029 A1* | 1/2016 | Ivey | G09C 1/00 705/44 |
| 2016/0294867 A1* | 10/2016 | Tao | H04L 63/1416 |
| 2017/0118241 A1* | 4/2017 | Call | H04L 67/04 |
| 2017/0220806 A1* | 8/2017 | Munoz | G06F 21/577 |
| 2018/0069913 A1* | 3/2018 | Walfish | H04L 63/168 |
| 2018/0109426 A1* | 4/2018 | Hunt | G06F 16/9566 |
| 2018/0349602 A1* | 12/2018 | Johns | G06F 21/552 |
| 2019/0068638 A1* | 2/2019 | Bartik | H04L 63/1483 |
| 2019/0327267 A1* | 10/2019 | Onut | H04L 67/02 |
| 2019/0334936 A1* | 10/2019 | Starov | H04L 63/1416 |
| 2020/0358781 A1* | 11/2020 | Edwards | H04L 63/102 |
| 2021/0105298 A1* | 4/2021 | Nagaraja | G06F 40/14 |
| 2021/0203694 A1* | 7/2021 | Paquet | H04L 63/1483 |
| 2021/0382949 A1* | 12/2021 | Yastrebenetsky | G06F 16/951 |
| 2022/0030029 A1* | 1/2022 | Kagan | G06F 21/44 |
| 2022/0092214 A1* | 3/2022 | Brannon | G06F 21/577 |
| 2022/0237240 A1* | 7/2022 | Kim | G06F 16/9574 |
| 2023/0026121 A1* | 1/2023 | Drapeau | G06F 16/9566 |
| 2023/0188566 A1* | 6/2023 | Jones | G06F 18/217 726/22 |
| 2025/0023912 A1* | 1/2025 | Hu | H04L 63/1483 |
| 2025/0080572 A1* | 3/2025 | Sanchez Rola | H04L 63/1441 |

\* cited by examiner

PROTECTING AGAINST HARM CAUSED BY MALICIOUS WEBSITES

BACKGROUND

Malicious websites plague the Internet today. Indeed, there exist so many malicious websites that total avoidance is difficult. Websites may be malicious for a number of different reasons. For example, some websites may be malicious because they violate the privacy of visiting users. Other websites may be malicious because they compromise the security of vising users. Regardless of their malicious nature, Internet users are well advised to avoid these websites. Malicious website not only compromise the privacy and security of users, but they can also damage the functionality of devices that are used to access the sites. However, avoidance is not easy because, in addition to the large number of malicious websites that exist on the Internet, recognizing a website as malicious can be difficult.

While there exist both server-side and client-side web analysis tools that attempt to identify malicious websites, the effectiveness of these tools is limited. Server-side web analysis tools often try to imitate real users' browsing sessions to explore and evaluate different web pages on a website. However, some websites require some user input to access certain pages. These pages are often missed by server-side tools. On the other hand, client-side web analysis tools are able to access these web pages, but these tools are often only able to analyze one page at a time. Information from multiple web pages is not considered collectively to identify whether a website is malicious. Thus, both server-side and client-side tools are limited in their effectiveness to accurately identify malicious websites.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for protecting against harm caused by malicious websites, at least a portion of the method being performed, at least in part, by a computing device comprising one or more processors. The method may include receiving first resource data from a first web page on a website that is accessed by a first user, receiving second resource data from a second web page on the website that is accessed by the first user, correlating the first and second resource data, determining, based on an analysis of the correlated resource data, that the website is malicious, and performing a security action relating to the website.

In some embodiments, the first and second resource data may include data that is relevant to user privacy. For example, the data that is relevant to user privacy may include tracking scripts loaded, browser cookies created, fingerprinting API calls, or user identifiers shared by the first and second web pages. In this embodiment, the first and second resource data may be correlated by combining the data from the first and second web pages that is relevant to user privacy and the website may be determined to be malicious based on a user privacy violation.

In some embodiments, the first and second resource data may include data that is relevant to user security. For example, the resource data that is relevant to user security may include code injections or an amount memory usage by the first and second web pages. In this embodiment, the first and second resource data may be correlated by combining the data from the first and second web pages that is relevant to user security and the website may be determined to be malicious based on a fraudulent activity.

In some embodiments, the method may further include receiving third resource data from a third web page on the website that is accessed by a second user and correlating the first, second, and third resource data.

In some embodiments, access to the first web page may require an input by the first user. In this embodiment, the input may be a password or an answer to a challenge-response test.

In some embodiments, the security action may prevent the user from accessing any additional pages on the website or forces the user to leave the website altogether.

In some embodiments, one or more non-transitory computer-readable media may comprise one or more computer-readable instructions that, when executed by one or more processors of a computing device, cause the computing device to perform a method for protecting against harm caused by malicious websites.

In some embodiments, a computing device comprising one or more processors and one or more non-transitory computer-readable media comprising one or more computer-readable instructions that, when executed by the one or more processors, may cause the computing device to perform a method for protecting against harm caused by malicious websites.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings, in which.

DETAILED DESCRIPTION

Figure 1:
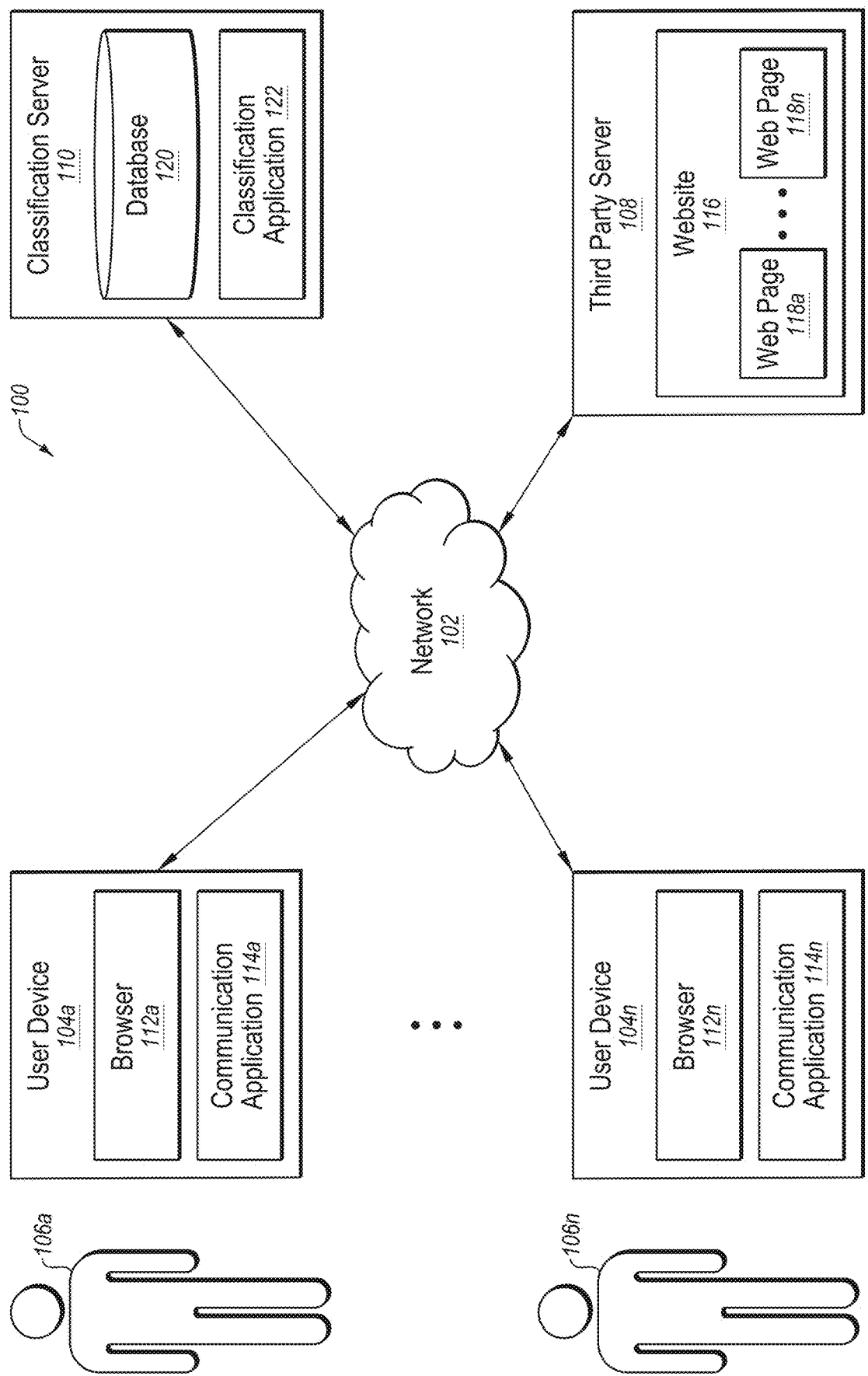
FIG. 1 illustrates an example system configured for protecting against harm caused by malicious websites.

The myriad of malicious websites that exist today make avoiding all of them during a browsing session on the Internet nearly impossible. Some websites are malicious because they violate the privacy of visiting users. For example, some websites may load tracking scrips or create browser cookies that track online movements of a user. Other websites are malicious because they compromise the security of a user through some fraudulent activity. For example, some websites may collect personal information about the user that could be used to perpetuate some fraudulent activity. Other fraudulent websites may offer for sale goods or services that are never delivered or performed. Fraudulent websites often install harmful software such as spyware or malware to accomplish their malicious objectives.

Regardless of their malicious nature, Internet users are well advised to avoid these websites. Malicious website not only compromise the privacy and security of users, but they can also damage the functionality of devices that are used to access the sites. However, avoidance is not easy because, in addition to the large number of malicious websites that exist on the Internet, recognizing a website as malicious can be difficult. Web analysis tools exist, but have shortcomings that prevent them from identifying malicious websites reliably. For example, server-side web analysis tools often attempt to imitate real users' browsing sessions to explore and evaluate different web pages on a website. However, some websites require some user input to access certain pages. These pages are often missed by server-side tools. On the other hand, client-side web analysis tools are able to access these web pages, but these tools are often only able to analyze one page at a time. Information from multiple web pages is not considered collectively to identify whether a website is malicious. For example, a malicious website that implements a multi-stage phishing attack may seek small pieces of data from visitors on separate pages of the website. If considered individually, these pages may not be sufficient to conclude that the website as malicious. However, if the web pages are correlated and considered collectively, it may be clear that the website is likely collecting this data to be used in some fraudulent activity.

Exemplary embodiments of the present disclosure may protect against harm caused by malicious websites by providing a more accurate and reliable system and method for identifying malicious websites. In particular, some embodiments of the present disclosure may receive first data from a first web page on a website that is accessed by a first user and second data from a second web page on the website that is accessed by a second user. This data may be correlated and analyzed. Based on this analysis, a determination may be made that the website is malicious and a security action can be performed.

The data that is received from web pages, correlated, and analyzed may include more than just a uniform resource locator (URL) or a domain address (or "site location data") from a web page. For example, the data that is received from web pages, correlated, and analyzed to determine whether a website is malicious, according to embodiments of the present disclosure, may include resource data. As used herein, the term "resource data" includes data—other than site location data-obtained from a web page. This resource data may include, but is not limited to, code (which may include tracking scripts), contents (including text and images displayed), cookies, API calls, identifiers shared, memory usage, code injections, and software downloads from the web page.

Turning to the figures, FIG. 1 illustrates an example system 100 configured for protecting against harm caused by malicious websites. The system 100 may include a network 102, a user devices 104a-104n and associated users 106a-106n, a third party server 108, and a classification server 110.

In some embodiments, the network 102 may be configured to communicatively couple the user devices 104a-104n, the third party server 108, and the classification server 110. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), a cellular network, the Internet, or some combination thereof.

Figure 4:
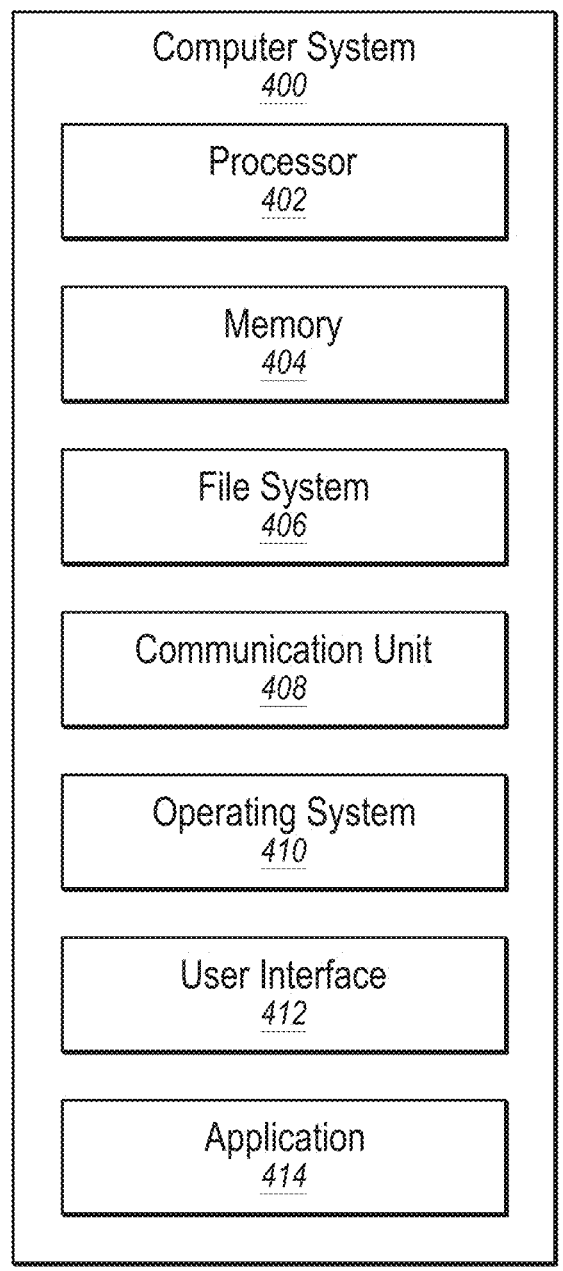
FIG. 4 illustrates an example computer system that may be employed to protect against harm caused by malicious websites.

In some embodiments, the user devices 104a-104n may be any computer system capable of communicating over the network 102, examples of which are disclosed herein in connection with the computer system 400 of FIG. 4. The user devices 104a-104n include browsers 112a-112n, respectively. Through the browsers 112a-112n the users 106a-106n may access websites through the network 102. The user devices 104a-104n also include communication applications 114a-114n, respectively. As provided in more detail hereafter, the communication applications 114a-114n may communicate data to the classification server 110.

In some embodiments, the third party server 108 may be any computer system capable of communicating over the network 102 and hosting a website 116, examples of which are disclosed herein in connection with the computer system 400 of FIG. 4. The website 116 comprises a plurality of individual web pages 118a-118n. The website 116 may be any type of website. For example, it may be an ecommerce, informational, entertainment, or another category of website. In some embodiments, the one or more of the webpages 118a-118n may require some user input to access, such as a password. The website 116 may be accessed by the users 106a-106n through the browsers 112a-112n on user devices 104a-104n.

In some embodiments, the classification server 100 may be any computer system capable of communicating over the network 102, examples of which are disclosed herein in connection with the computer system 400 of FIG. 4. The classification server 110 includes a database 120 and a classification application 122. The classification server 110 may receive data from the user devices 104a-104n through the communication applications 114a-114n. This data may include data relating to websites, for example the website 116, that the users 106a-106n have visited through the browsers 112a-112n. Specifically, this data may include resource data, such as text and images displayed, scripts loaded, cookies created, API calls, identifiers shared, storage, memory usage, code injections, software downloads, etc. for each web page 118a-118n visited on the website 116. The data may also include site location data.

This data may be stored in the database 120. The classification application 122 may correlate this data by comparing data from separate web pages 118a-118n. The classification application 122 may evaluate a user's browsing in real-time to obtain a more complete data set that allows a more fine-grain analysis of the website. Specifically, the classification application 122 can correlate the data observed in web pages accessed prior to a current page that is displayed and make a determination regarding whether the website is malicious based on a collective analysis all of the web pages that one or more of the users 106a-106n have visited on the website 116. Thus, as the users 106a-106n progress through different web pages 118a-118n on the website 116, the "state" of the evaluation of the website 116 may be maintained and updated as new web pages are visited and new data from these web pages is received. In some embodiments, data from previous web pages visited by a user on a website may be stored and aggregated with additional data from subsequent visits to the website until sufficient data exists for the classification application 122 to determine whether the website is malicious.

Based on an analysis of this data, the classification application 122 may determine whether a website is malicious and if the website is determined to be malicious, a security action may be performed. In some embodiments, the security action may include a notification, displayed to the user, that the website is malicious. In other embodiments, the security action may prevent the user from accessing any additional pages on the website or forcing the user to leave the website altogether. In scenarios where the website is an e-commerce website, the security action may prevent the user from entering payment information into the website to purchase a product.

The classification application 122 may be implemented in a number of different ways. In one embodiment, the browsers 112a-112n may be custom browsers into which the classification application 122 is directly implemented. In alternative embodiments, the classification application 122 may be implemented as a browser extension.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1. In one such embodiment, a classification application may be installed on one or more of the user devices 104a-104n. In these embodiments, the tasks performed by the classification application 122 may be split between the classification application 122 and the classification applications installed on the one or more user devices 104a-104n. Alternatively, in other embodiments, all of the tasks performed by the classification application 122 may be performed by classification applications installed on the user devices 104a-104n, such that the classification application 122 is unnecessary and the classification tasks are performed entirely locally on the user devices 104a-104n.

Figure 2:
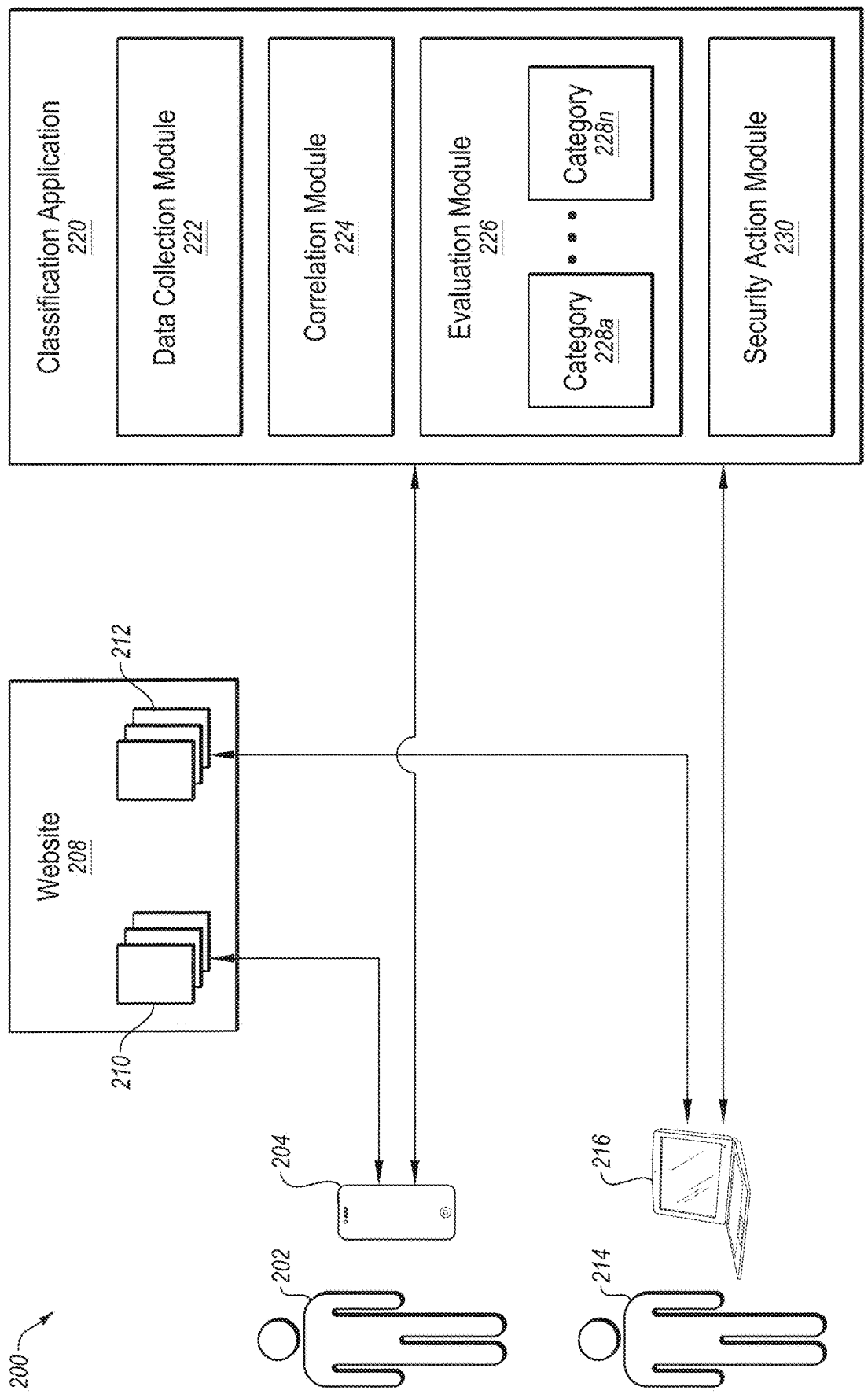
FIG. 2 illustrates a diagram for protecting against harm caused by malicious websites.

FIG. 2 illustrates a diagram 200 for protecting against harm caused by malicious websites. The diagram 200 includes a first user 202 who is associated with a first user device 204. Through a browser on the user device 204, the first user 202 accesses a website 208 and a first set of web pages 210 on the website 208. The first time that the user 202 visits the website 208, an instance may be created for the website.

Data from the first set of web pages 210 may be collected by the user device 204 and sent to a data collection module 222 of a classification application 220. In some embodiments, the classification application 220 may be external to the user device 204. In other embodiments, the classification application 220 may be locally installed on the user device 204. Each time a new web page is visited, data from that page may be sent to the data collection module 222 such that the classification application 220 has access to data from a plurality of web pages from the web site 208. This data may be collected during a single browsing session on the website 208, or during multiple browsing sessions on the website 208 at different times. For example, the user 202 may visit some but not all of the web pages 210 during a first visit to the website 208. During a subsequent visit to the website 208, the user 202 may visit other web pages 210. Regardless of when the user 202 accessed the web pages 210, data from each of the web pages 210 is acquired and sent to the data collection module 222.

A correlation module 224 may combine the data received by the data collection module 222. The correlation module 224 may organize data received so that data from different web pages of a website can be analyzed together. In addition, the correlation module 224 may organize data received so that similar data from different pages on a single website, or data that is relevant to a common issue on the website, is identified. For example, data that is relevant to the issue of website privacy from a number of different web pages on a website may be identified and combined by the correlation module 224. This data may include tracking scripts loaded onto web pages, browser cookies created, fingerprinting API calls, user identifiers shared, and other data relevant to the issue of website privacy. The correlation module 224 may identify and combine data relevant to the issue of website security including payment options offered, text used on web pages, memory usage, code injections, software downloads and other data relevant to the issue of website privacy.

Once correlated, an evaluation module 226 may analyze the correlated data to determine whether the website is malicious. There are a number of different methodologies that may be employed to determine whether a website is malicious. For example, with regard to privacy, the evaluation module 226 may identify a website as malicious based on how data is shared. In one embodiment, the evaluation module 226 may identify a website as malicious if a user visits a home page of a website, a browser fingerprinting hash is created, and the value is saved on a local storage. When the user visits another web page on this website the stored value may be read and then shared with another website. If web pages are analyzed separately, this behavior would likely not be detectable but when analyzed collectively, as described here, this malicious behavior may be identified.

With regard to security, in one embodiment, the evaluation module 226 may identify a website as malicious if a user visits a main page of a website and creates a new account. As the user steps through the account creation process, which may include directing the user through different web pages, it may be determined based on data from these web pages that the website has not implemented a proper account creation system with standard security in place. In another embodiment, the evaluation module 226 may identify an e-commerce website as malicious based on data received from different web pages as the user attempts to purchase a product. For example, the user may add an item to a cart and proceed to the checkout web page. If entry of credit card payment information fails, the user may be encouraged to pay via an unusual scheme (e.g., zelle, venmo, wire transfer, bitcoin, etc.). This may also be indicative of a malicious website. Internal inconsistencies in different web pages on a website may also indicate a malicious website. For example, a website's main page may claim that the company is based in the U.S. However, other web pages may imply that the company is based outside of the United States. This may be discovered, in some cases, when a product is to be shipped from a foreign country.

In some embodiments, a threshold level of confidence may be required before a website is identified as malicious. If a website is not identified as malicious, data from additional web pages may be collected so that an analysis of the website may be performed on the most updated version of correlated data. In some embodiments, a website may be identified as malicious based on data collected from multiple different web pages during multiple different browsing sessions.

The evaluation module 226 may also assign websites that it evaluates into one of a plurality of categories 228a-228n. These categories may include one or more privacy categories and one or more security categories. The privacy categories may include websites that violate users' privacy. Additional subcategories may include the specific ways in which the website violates users' privacy. The security categories may include websites that violate users' security.

Additional subcategories may include the specific fraudulent activities that the websites implement to violates users' security.

Once a website is determined to be malicious, a security action module 230 may determine and implement an appropriate security action. The security action may include a notification, displayed to the user, that the website is malicious. In other embodiments, the security action may prevent the user from accessing any additional pages on the website or forcing the user to leave the website altogether. In scenarios where the website is an e-commerce website, the security action may prevent the user from entering payment information into the website to purchase a product.

In some embodiments, the evaluation module 226 may evaluate correlated data that has been received from a single user, for example, the user 202. In this embodiment, the evaluation module would consider only the web pages 210 to determine whether the website 208 is malicious. However, in other embodiments, data that is gathered from a website by more than one individual may be used to determine whether the website is malicious. Data may be collected from any number of different users and used to determine whether the website is malicious. In one embodiment, a user may be provided a choice regarding whether to share data collected during the user's browsing session. The user may elect to maintain data collected from the user's browsing session private, so that a determination regarding whether a website is malicious is based only on the web pages that the user visits. Alternatively, the user may elect to share the data collected from web pages visited so that the user's browsing session is part of a crowd sourcing process for identifying malicious websites.

For example, in the diagram 200, a second user 214 is associated with a second user device 216. The second user 214 may accesses, through a browser, a second set of web pages 212 on the website 208. The second set of web pages 212 may be different from the first set of web pages 210. Data from the second set of web pages 212 may be collected by the user device 216 and sent to the data collection module 222 of the classification application 220. If the users 202 and 214 have elected to share the data from web pages they visit, the correlation module 224 may combine the data from both the first set of web pages 210 and the second set of web pages 212. In this embodiment, the evaluation module 226 may determine whether the website 208 is malicious based on the data from the browsing sessions of both user 202 and user 204 on the website 208. Alternatively, if the user 214 has not elected to share data, the evaluation module 226 may decide whether the website 208 is malicious based on the web pages 212 alone.

Modifications, additions, or omissions may be made to the diagram 200 without departing from the scope of the present disclosure. For example, the diagram 200 may include additional components similar to the components illustrated in FIG. 2 that each may be configured similarly to the components illustrated in FIG. 2.

Figure 3:
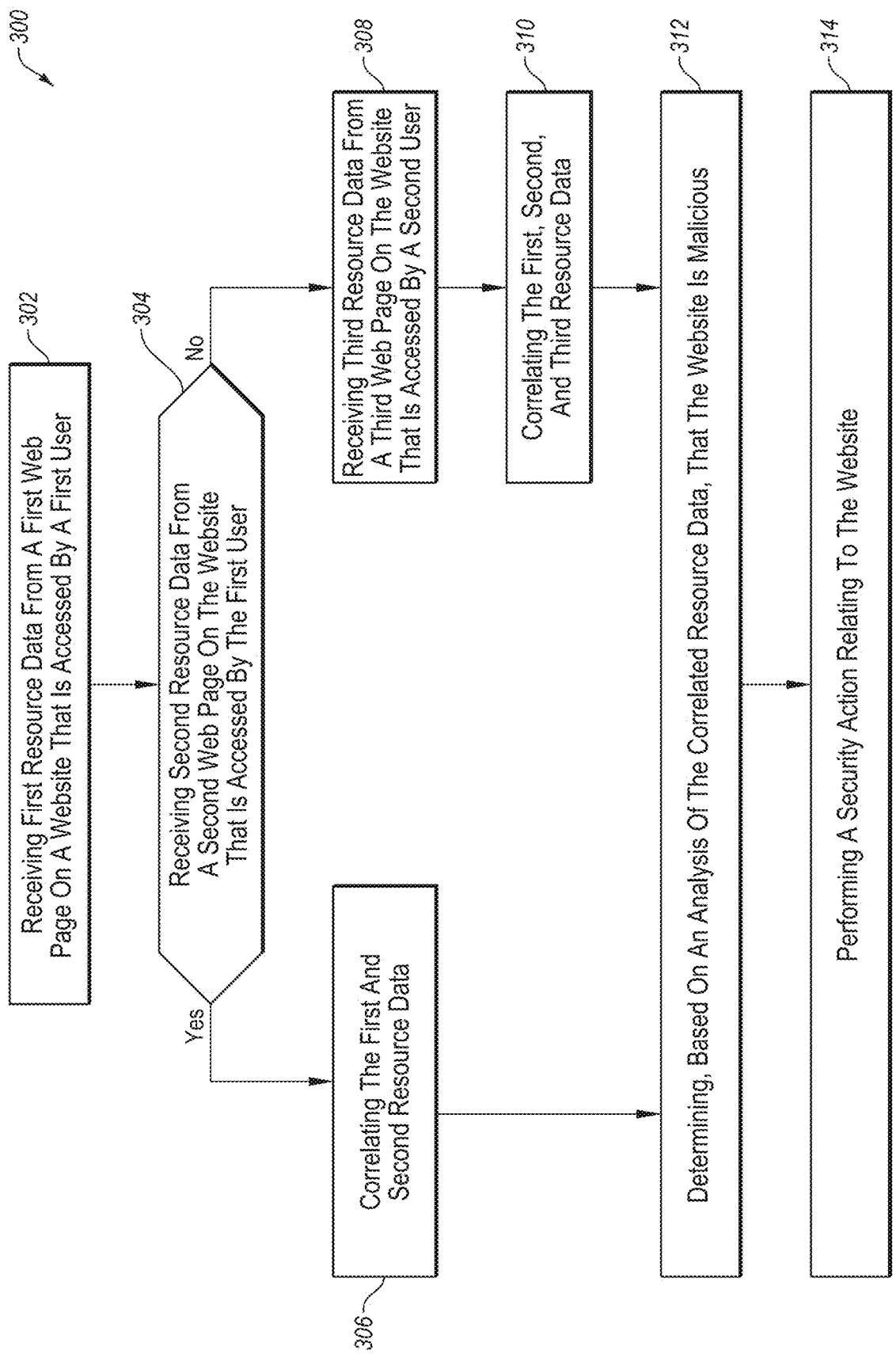
FIG. 3 is a flowchart of an example method for protecting against harm caused by malicious websites.

FIG. 3 is a flowchart of an example method 300 for protecting against harm caused by malicious websites. The method 300 may be performed, in some embodiments, by a device or system, such as by the classification application 122 or 220 of FIGS. 1 and 2, respectively. In these and other embodiments, the method 300 may be performed by one or more processors based on one or more computer-readable instructions stored on one or more non-transitory computer-readable media.

The method 300 may include, at action 302, receiving first data from a first web page on a website that is accessed by a first user and, at action 304, receiving second data from a second web page on the website that is accessed by the first user. Any type of data may be received from web pages. The data, for example, may include text and visual elements on the web page, scripts loaded, cookies created, API calls, identifiers shared, memory usage, code injections, software downloads, etc.

The method 300 may include, at action 306, correlating the first and second data. In some embodiments, the first and second data may be correlated by collecting data from web pages from a specific website and separating it from other data from different websites. In another embodiment, the first and second data may be correlated by identifying and combining data that is relevant to a specific issue, such as website privacy. In this embodiment, data relevant to the issue of website privacy, including tracking scripts loaded, browser cookies created, fingerprinting API calls, or user identifiers shared by the first and second web pages, may be combined. In another embodiment, the first and second data may be correlated by identifying and combining data that is relevant to another issue, such as website security. In this embodiment, data relevant to the issue of website security, including code injections or memory usage by the first and second web pages, may be combined.

The method 300 may include, at action 308, receiving third data from a third web page on the website that is accessed by a second user. Similar to the first data and the second data, the third data may include any type of data may that is available on the third web page. The third web page may be different from the first and second web pages.

The method 300 may include, at action 310, correlating the first, second, and third data. The first, second, and third data may be correlated in a way that is similar to the correlating performed in action 306. However, unlike the action 306, the correlating at action 310 includes data from a first user as well as data from a second user.

The method 300 may include, at action 312, determining, based on an analysis of the correlated data, that the website is malicious. In some embodiments, this determination may not be made until a minimum amount of data relating to the website is obtained, or until a minimum threshold of confidence is achieved establishing that the website is malicious. This determination may be based entirely on data received from the first user. However, this determination may alternatively be based on data that is received from both the first user and the second user. Regardless of the source of the data, a determination that the website is malicious may be made.

The method 300 may include, at action 314, performing a security action relating to the website. The security action may include a notification, displayed to the user, that the website is malicious. In other embodiments, the security action may prevent the first and/or second user from accessing any additional pages on the website or forcing the user to leave the website altogether. In scenarios where the website is an e-commerce website, the security action may prevent first and/or second user from entering payment information into the website to purchase a product.

Thus, the method 300 allows for more than a single web page to be analyzed to determine whether a website is malicious. By considering more than a single web page, the method 300 provides a method for more efficiently determining whether a website is malicious. For example, if a website performs different parts of a malicious operation on different web pages, if these web pages are considered alone, the malicious operation may not be recognized. For example, if a user's name is sought on one web page, the user's birthdate is sought on another web page, and a location of the user's birth is sought on another web page, alone these pieces of information may not be sufficient to establish that the website is malicious. However, if these web pages and the information that they seek are considered collectively, it may be determined that the website is malicious.

Although the actions of the method 300 are illustrated in FIG. 3 as discrete actions, various actions may be divided into additional actions, combined into fewer actions, reordered, expanded, or eliminated, depending on the desired implementation. For example, in some embodiments, data from web pages on a website may be received from more than one or two users. Indeed, in some embodiments, data from a large number of users may be used to determine whether a website is malicious.

Further, it is understood that the method 300 may improve the functioning of a computer system itself. Malicious websites often degrade the functionality of computing devices that visit these sites. This is often because software that is used to track or participate in some fraudulent activity is often installed on the devices that visit these malicious websites. This installed software will often, at best, slow the processing speeds of the computing device. At worst, the installed software can prevent the computing device from functioning at all.

Also, the method 300 may improve the technical field of malicious website identification. By considering more than just a single web page in an analysis of a website, a much more comprehensive evaluation of the website is possible. Websites that are evaluated on a page by page basis may not catch websites that coordinate a malicious activity through a plurality of separate web pages on the website.

FIG. 4 illustrates an example computer system 400 that may be employed to protect against harm caused by malicious websites. In some embodiments, the computer system 400 may be part of any of the systems or devices described in this disclosure. For example, the computer system 400 may be part of any of the user devices 104a-104n, the third party server 108 and the classification server 110 of FIG. 1 and the user devices 204 and 216 of FIG. 2.

The computer system 400 may include a processor 402, a memory 404, a file system 406, a communication unit 408, an operating system 410, a user interface 412, and an application 414, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 402 may include any suitable special-purpose or general-purpose computer, computing entity, or processing device including various computer hardware or software applications and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more of the actions of the methods disclosed herein.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more of the actions of the methods disclosed herein. These computer-executable instructions may be included, for example, in the operating system 410, in one or more applications, such as the communication applications 114a-114n, the classification application 122, and the classification application 220, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The application 414 may be one or more computer-readable instructions stored on one or more non-transitory computer-readable media, such as the memory 404 or the file system 406, that, when executed by the processor 402, is configured to perform one or more of the actions of the methods disclosed herein. In some embodiments, the application 414 may be part of the operating system 410 or may be part of an application of the computer system 400, or may be some combination thereof. In some embodiments, the application 414 may function as any one of the communication applications 114*a*-114*n* and the classification application 122 of FIG. 1 and the classification application 220 of FIG. 2.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software applications, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and applications described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for protecting against harm caused by malicious websites, at least a portion of the method being performed by a computing device comprising one or more processors, the method comprising:
- receiving first resource data obtained from a first web page on a website that is accessed by a first user;
- receiving second resource data obtained from a second web page on the website that is accessed by the first user;
- correlating the first and second resource data;
- analyzing the correlated resource data such that the correlated resource data is considered collectively;
- determining, based on the collective analysis of the correlated resource data, that the website is malicious; and
- performing a security action relating to the website in response to the website being determined to be malicious.

2. The method of claim 1, wherein the first and second resource data includes data that is relevant to user privacy.

3. The method of claim 2, wherein the data that is relevant to user privacy includes tracking scripts loaded, browser cookies created, fingerprinting API calls, or user identifiers shared by the first and second web pages.

4. The method of claim 3, wherein the first and second resource data is correlated by combining the resource data from the first and second web pages that is relevant to user privacy.

5. The method of claim 4, wherein the website is determined to be malicious based on a user privacy violation.

6. The method of claim 1, wherein the first and second resource data includes data that is relevant to user security.

7. The method of claim 6, wherein the data that is relevant to user security includes code injections or an amount memory usage by the first and second web pages.

8. The method of claim 7, wherein the first and second resource data is correlated by combining the resource data from the first and second web pages that is relevant to user security.

9. The method of claim 8, wherein the website is determined to be malicious based on a fraudulent activity.

10. The method of claim 1, further comprising:
- receiving third resource data obtained from a third web page on the website that is accessed by a second user;
- correlating the first, second, and third resource data; and
- analyzing the correlated resource data such that the correlated resource data is considered collectively.

11. The method of claim 1, wherein access to the first web page requires an input by the first user.

12. The method of claim 11, wherein the input is a password or an answer to a challenge-response test.

13. The method of claim 1, wherein the security action prevents the user from accessing any additional pages on the website or forces the user to leave the website altogether.

14. One or more non-transitory computer-readable media comprising one or more computer-readable instructions that, when executed by one or more processors of a computing device, cause the computing device to perform a method for protecting against harm caused by malicious websites, the method comprising:
- receiving first resource data obtained from a first web page on a website that is accessed by a first user;
- receiving second resource data obtained from a second web page on the website that is accessed by the first user;
- correlating the first and second resource data;
- analyzing the correlated resource data such that the correlated resource data is considered collectively;
- determining, based on the collective analysis of the correlated resource data, that the website is malicious; and
- performing a security action relating to the website in response to the website being determined to be malicious.

15. The one or more non-transitory computer-readable media of claim 14, wherein the first and second resource data includes data that is relevant to user privacy.

16. The one or more non-transitory computer-readable media of claim 15, wherein the first and second resource data is correlated by combining the data from the first and second web pages that is relevant to user privacy.

17. The one or more non-transitory computer-readable media of claim 14, wherein the first and second resource data includes data that is relevant to user security.

18. The one or more non-transitory computer-readable media of claim 17, wherein the first and second resource data is correlated by combining the data from the first and second web pages that is relevant to user security.

19. The one or more non-transitory computer-readable media of claim 14, further comprising:
- receiving third resource data obtained from a third web page on the website that is accessed by a second user;
- correlating the first, second, and third resource data; and
- analyzing the correlated resource data such that the correlated resource data is considered collectively.

20. A computing device comprising:
- one or more processors; and
- one or more non-transitory computer-readable media comprising one or more computer-readable instructions that, when executed by the one or more processors, cause the computing device to perform a method for protecting against harm caused by malicious websites, the method comprising:
  - receiving first resource data obtained from a first web page on a website that is accessed by a first user;
  - receiving second resource data obtained from a second web page on the website that is accessed by the first user;
  - correlating the first and second resource data;
  - analyzing the correlated resource data such that the correlated resource data is considered collectively;
  - determining, based on the collective analysis of the correlated resource data, that the website is malicious; and
  - performing a security action relating to the website in response to the website being determined to be malicious.

* * * * *